Feb. 2, 1960  G. R. HOLLINGER  2,923,097
SEALING ARBOR
Filed Nov. 3, 1958  2 Sheets-Sheet 1
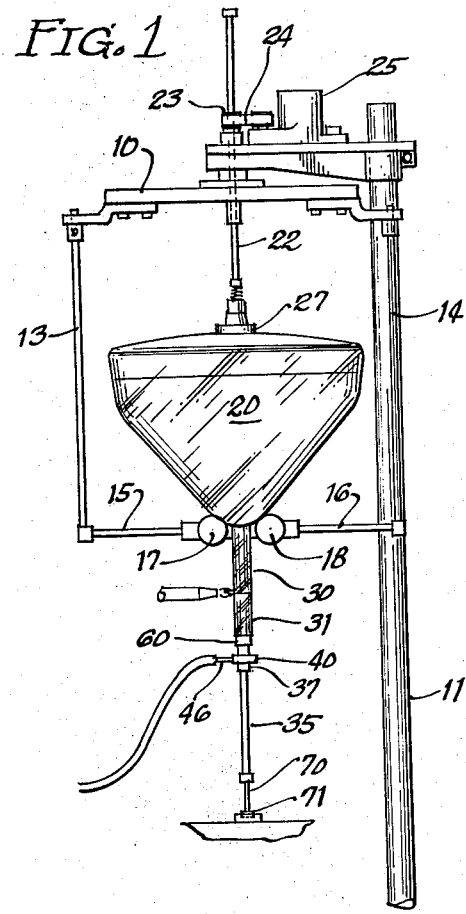
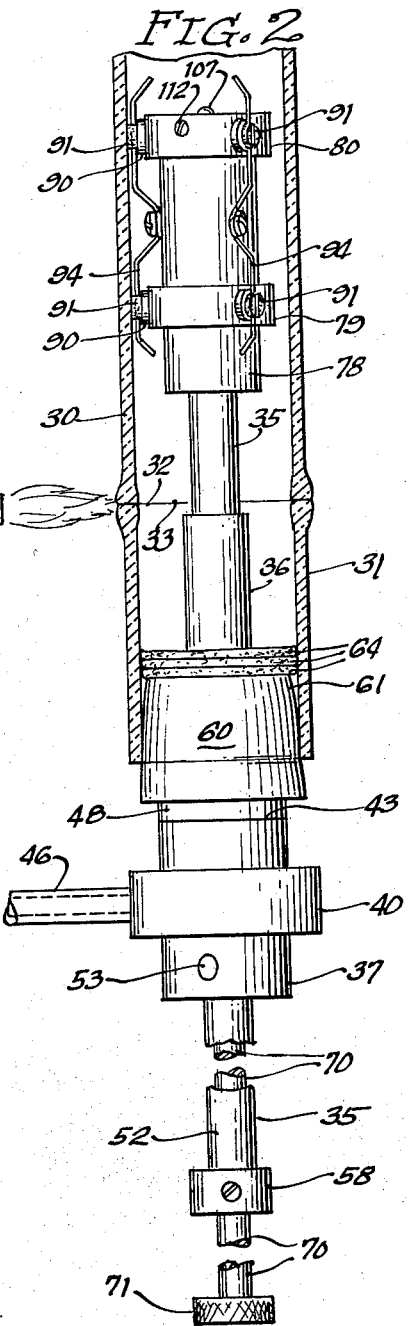
INVENTOR.
Gale R. Hollinger
BY Robert L. Kahn
Attorney Feb. 2, 1960  G. R. HOLLINGER  2,923,097
SEALING ARBOR
Filed Nov. 3, 1958  2 Sheets-Sheet 2
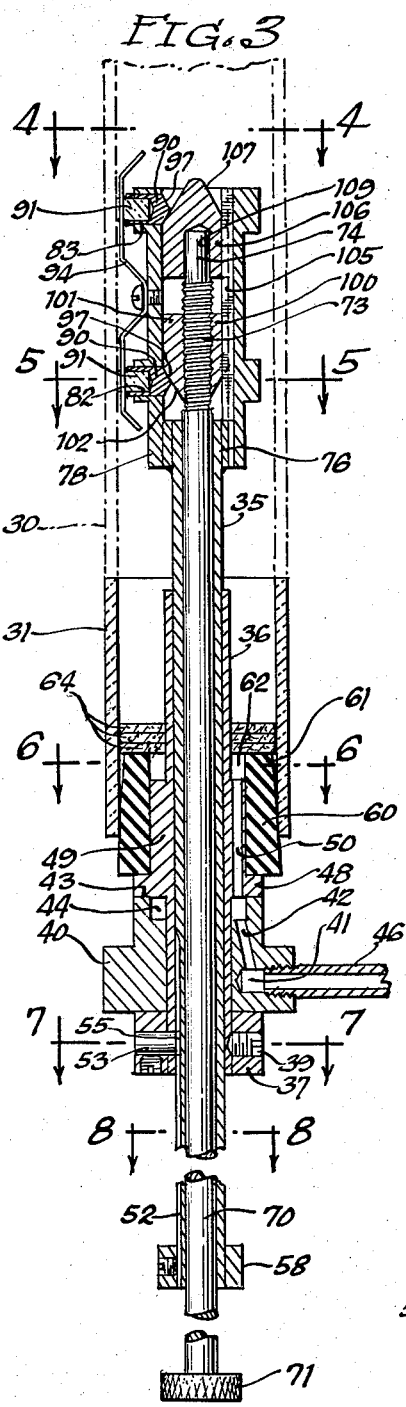
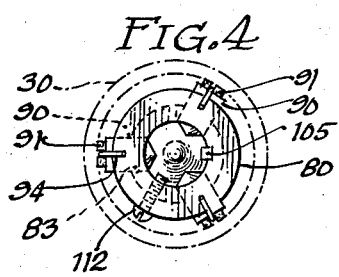
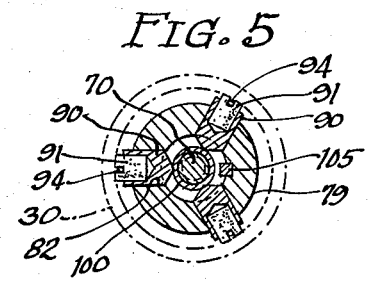
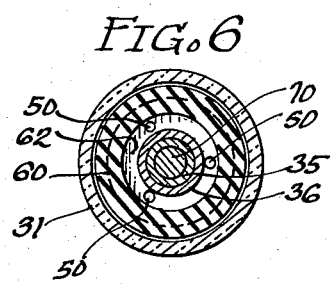
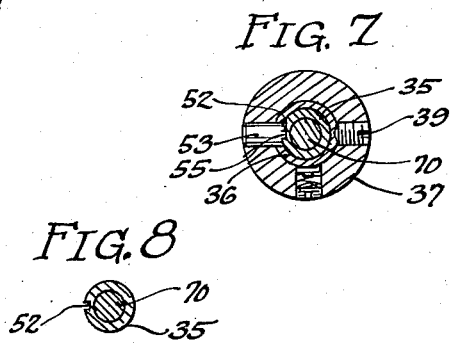
INVENTOR.
Gale R. Hollinger
BY Robert L. Kahn
Attorney

United States Patent Office 2,923,097
Patented Feb. 2, 1960

2,923,097

SEALING ARBOR

Gale R. Hollinger, Glen Ellyn, Ill.

Application November 3, 1958, Serial No. 771,540

10 Claims. (Cl. 49—1)

This invention relates to a sealing arbor for cathode ray tubes and more particularly to a sealing arbor for use in connection with the repair of a cathode ray tube. While the invention may be applied to other devices than cathode ray tubes, it is particularly useful in such tubes and will be explained in connection therewith.

As is well known, a cathode ray tube generally consists of the bulb proper, a neck and the mount plus the usual base. The bulb proper has a generally conical shape terminating in a flat or round end where a cathode ray trace may be viewed. Such tubes are widely used in television receivers as well as in many test devices. Due to the high initial cost of a cathode ray tube, it is frequently desirable to repair such tubes after the tube has become inoperative. As a rule, the glass envelope may be opened by cutting at any desired portion thereof.

In the repair of such cathode ray tubes, it is customary to cut the glass at the neck. This permits the removal of the mount comprising an electron gun and control assembly from the bulb proper. Assuming that satisfactory tube components are provided, it is necessary to reassemble the various glass portions and make a unitary envelope for the device. This includes providing a new neck portion to replace that lost during the opening of the tube. Adding a new neck to the envelope has usually been accomplished in glass lathes having means for aligning the bulb and a length of glass tubing so that the two may be welded together. The alignment of the tubing with the bulb neck must be effected with substantial accuracy due to the geometry of the tube.

Because of the substantial weight of the glass involved considerable difficulty has been experienced in handling the glass parts during the welding of a new neck to a cathode ray tube bulb. It is, of course, of the utmost importance that during the welding and during the cooling the glass parts be maintained in perfect relative position so that a strong joint will result. The ungainly shape of the cathode ray bulb together with the great weight of the glass has been a principal factor in the problem of handling the parts.

In accordance with the present invention a simple and efficient sealing arbor is provided which facilitates the quick and accurate welding of a new neck to a cathode ray bulb and makes possible the perfect alignment of the parts preparatory to and during the welding operation.

For a thorough understanding of the invention reference will now be made to the drawings wherein Figure 1 is an elevation of a setup including the new sealing arbor for welding a neck to a cathode ray tube bulb.

Figure 2 is an elevation with certain parts in section of the new sealing arbor embodying the present invention and portions of glass at the weld.

Figure 3 is a view in section of the sealing arbor embodying the present invention, this figure illustrating the centering and retaining means for the bulb neck portion.

Figures 4 to 8 inclusive are sections on lines 4—4; 5—5; 6—6; 7—7 and 8—8, respectively of Figure 3.

Referring to Figure 1, a setup illustrating the manner in which the sealing arbor may be used is shown. Bracket 10, suitably supported from post 11, has depending rods 13 and 14. The bottom of each of rods 13 and 14 carries arms 15 and 16 extending toward each other and terminating in bulb supporting fixtures 17 and 18, respectively. Fixtures 17 and 18 are adapted to support a cathode ray tube bulb in inverted position and are preferably smooth so that bulb 20 of a cathode ray tube may be rotated with respect to fixtures 17 and 18. Fixtures 17 and 18 may have any desired shape and will have sufficient angular extent so that bulb 20 may be properly supported.

While two fixtures 17 and 18 are shown it is possible to have three or four fixtures disposed around the bottom of the tube for stable support.

Rotatively supported in bracket 10 is vertical shaft 22 which may be rotated from pulley 23 connected by belt 24 to electric motor 25. Shaft 22 terminates in friction pad 27 at the bottom thereof for engaging the central portion of bulb 20. Preferably friction pad 27 is spring loaded to press against the face of bulb 20 so that bulb 20 may be rotated around the vertical axis. Means may be provided for elevating shaft 20 to clear pad 27 from the face of the tube so that bulb 20 may be removed or inserted.

The construction so far described provides a glass lathe for operation with respect to a vertical axis. As illustrated here, bulb 20 has depending neck stub 30 which normally extends below support fixtures 17 and 18. The objective of the invention is to permit glass tube 31 to be properly positioned and centered and supported with reference to the free edge of stub neck 30 so that a perfect weld may be secured. It is understood that glass parts 30 and 31 have abutting edges 32 and 33.

In order to accomplish the above objective, the sealing arbor illustrated in the various figures of this drawing and embodying the present invention is provided. The sealing arbor comprises elongated tube 35 around which is disposed sleeve 36. The bottom of sleeve 36 has rigidly clamped thereto collar 37. Collar 37 is retained tightly in position upon sleeve 36 by any suitable means, such as, for example, one or more set screws 39.

Rotatably disposed around sleeve 36 is outer sleeve 40. Outer sleeve 40 has radial air passage 41 extending inwardly from the exterior of the sleeve for a short distance and connects with longitudinal air passage 42 extending to the top of the sleeve. Sleeve 40 has top surface 43 finished smoothly and has annular well 44 provided adjacent top surface 43 at the inner portion of the sleeve. Well 44 provides an annular air chamber around the outside of sleeve 37. Sleeve 40 has threaded into recess 41 a short length of pipe 46.

Sleeve 36 is provided with shoulder 48 having a finished annular surface facing finished surface 43 of outer sleeve 40. Inner sleeve 36 continues beyond shoulder 48 to provide cylindrical body portion 49 beyond which inner sleeve portion 36 continues. Shoulder 48 and body portion 49 are provided with one or more air passages 50 extending parallel to the axis of the sleeve, such air passages extending through the entire length of body portion 49. As many air passages 50 will be provided as are necessary and in practice about two or three will generally suffice. Air passages 50 register with well 44 so that in all positions of the sleeve and tube a through passage for air from pipe 46 through passage 50 will be provided.

The entire assembly of sleeves 36 and 40 and collar 37 is slidable along tube 35. In order to prevent this assembly from rotating around tube 35, longitudinal slot 52 is provided in the outer surface of tube 35 and pin 53 locked by a set screw and carried by collar 37 will have tip 55 for engaging slot 52.

The bottom of tube 35 is provided with stop ring 58 bolted to tube 35 to maintain the same in position. Ring 58 prevents the entire assembly of sleeves from running off the bottom end of tube 35. Disposed around body 49 is flexible sleeve 60 of material like rubber. Sleeve 60 fits snugly about body 49 and will rest against the top side of shoulder 48. Sleeve 60 preferably is tapered as illustrated and has an outer diameter large enough so that glass tube 31 can be snugly fitted into position over the sleeve.

Flexible sleeve 60 has top portion 61 extending above the top end of body portion 49 to provide annular air chamber 62 into which air passages 50 may feed air. Loosely resting upon the top end of flexible sleeve 60 are some felt washers 64. It will be noted that the top portion of inner sleeve 36 extends well above the felt washers. Thus, inner sleeve 36 will be quite long in comparison to its diameter and will have a minimum tendency for cocking or binding.

Disposed within tube 35 is stem 70, the bottom of which is provided with foot 71. Stem 70 is longer than tube 35 and at the free end thereof has threaded portion 73 and pin 74 having a reduced diameter. Rigidly supported at top end portion 76 of tube 35 is head assembly sleeve 78. Head assembly sleeve 78 extends well beyond free end portion 76 of tube 35.

Head assembly sleeve 78 is provided with spaced flanges 79 and 80. Each of flanges 79 and 80 has a number, here illustrated as three, radial passages 82 and 83, respectively. Passages 82 are provided in flange 79 and passages 83 are provided in flange 80. While the passages in flange 79 are aligned with respect to the passages in flange 80, as seen from the top of the head, such alignment is not essential.

Each flange has three passages symmetrically disposed around the flange for the purpose of providing three point contacts. Passages 82 and 83 are preferably finished smoothly and accommodate fingers 90 for free radial movement. Fingers 90 are similar to each other and each comprises a metal body with ceramic tip 91. Fingers 90 are prevented from falling out by any suitable means such as, for example, by wire springs 94 attached to the body of sleeve 78 and bearing against the ends of the fingers. Ceramic tips 91 may be slotted in a manner similar to the head of a screw to accommodate the ends of the wire springs. Thus, the fingers are freely movable in and out of the sleeve but are prevented from falling out by the springs. Each finger 90 has the inside end finished to provide conical tip 97.

Cooperating with the bottom set of fingers in flange 79 is operating member 100 having cylindrical body portion 101 and conical cam portion 102. Operating member 100 has its center portion drilled and tapped to accommodate threaded portion 73 of stem 70. To prevent operating member 100 from turning with stem 70, longitudinal key 105 is provided in a slot on the inside surface of head sleeve 78. Operating member 100 is similarly slotted to accommodate key 105 to be locked against rotation by the key while permitting longitudinal movement of operating member 100.

A second operating member 106 having a generally similar construction to operating member 100 is provided. Operating member 106 has its conical cam portion 107 above the body. Operating member 106 has blind recess 109 into which reduced tip portion 74 of the stem extends.

It is clear that as stem 70 is turned, operating member 100 will function as a nut and go up or down depending upon the direction of rotation of stem 70. Assuming that a right-hand thread is used, clockwise rotation of stem 70, as seen from the bottom, will cause operating member 100 to move downwardly. Reverse rotation of stem 70 will cause operating member 100 to move upwardly, elevating cam portion 102 and permitting the bottom fingers in flange 79 to move into the flange wall.

With the movement of operating member 100 upwardly, as seen in Figure 3 for example, the separation between members 100 and 106 will be reduced. This will permit stem 70 to have some free vertical movement with respect to tube 35. In order to limit the upward travel of operating member 106, set screw 112 may be provided in flange 80 to gear against the conical surface of member 106 and prevent member 106 from being forced out completely.

A suitable support for foot 71 of the arbor is provided. Prior to the positioning of the sealing arbor as shown in Figure 1, glass tube 31 will have been positioned on flexible sleeve 60. In positioning glass tube 31, care will have to be exercised to be sure that tube 31 is properly centered. Thereafter, the sealing arbor with tube 31 in position and stem 70 in proper position is inserted into neck 30 of the cathode ray bulb.

In the proper position of stem 70, the various pins operating in flanges 79 and 80 will be movable to their inner positions so that the arbor head can readily be inserted in the neck of the tube. With the parts in position, as illustrated in Figure 1, stem 70 is now turned clockwise, as seen from the bottom of the stem. This results in conical operating members 100 and 106 separating and causing all the ceramic tipped fingers to be forced outwardly against the inside surface of the tube neck.

Stem 70 may be turned by hand and the movement of the centering fingers will serve to center the stub neck of bulb 20. With the bulb properly centered so that the bulb axis is true, neck portions 30 and 31 will be in perfect alignment. The sleeve assembly with auxiliary neck portion 31 is now moved upwardly so that neck portions 30 and 31 have their opposed edge portions 32 and 33 in contact with each other.

It is desirable to have the vertical position of the sleeve assembly maintained in any desired position during the welding of the glass parts. Inasmuch as the sleeve assembly need only support its own weight and the weight of glass neck portion 31 thereon, it is possible to provide enough friction of sleeve 36 on tube 35 so that the sleeve assembly may be readily moved by hand along the tube but will remain in adjusted position when left alone. This friction may be obtained by having tip 55 of pin 53 which rides in slot 52 tight enough so that any desired degree of friction may be obtained.

The electric motor is energized to rotate glass bulb 20. The sealing arbor and glass tube 31 rotate with the bulb. To prevent damage, it is preferred to have the bottom of foot 71 of the sealing arbor turn freely on its support surface. The bulb is turned in a direction such that any friction at foot 71 will maintain the fingers in flanges 79 and 80 tightly against the glass. Suitable gas burners may now be played upon the glass joint for effecting a glass weld. A rubber hose attached to air pipe 46 may be used by an operator for blowing air into the interior of neck portions 30 and 31 to prevent the molten glass from collapsing. The felt washers 64 are provided to diffuse the air and prevent any sudden gusts from blowing the glass out.

By careful control of the air, it is possible to obtain a smooth joint at the inside. This is important since the head of the arbor must be pulled out of the newly elongated built up neck. The outside of the weld may be smoothed down in any suitable fashion to provide a desirable finish.

In order to withdraw the sealing arbor, it will be necessary to turn stem 70 counter-clockwise, as seen from the bottom, so that the two operating members are brought closer together to permit the radial fingers from flanges 79 and 80 to move inwardly away from the glass wall.

It will be apparent that my invention provides a simple means for centering and aligning two tubular glass portions to be welded. The various portions of the entire construction may be made of suitable steel. Inasmuch as no metal directly contacts the glass at the weld region, there will be no problem with regard to the expansion of metal in comparison to the expansion of the glass.

Flexible sleeve 60 is one part which is non-metallic and which may be exposed to some heat. This sleeve, as a rule, is sufficiently far from the hot glass and from the gas flame so that there is little if any danger of burning. If desired, however, the member may be made of silicone rubber or a plastic such as a fluorinated chloroethylene, available in the market under the trade names Teflon or Kel–F. However, rubber, either of the natural or synthetic variety, may be used and will function satisfactorily.

Felt washer 64 will also operate for long periods of time without damage. If desired, these washers may be made of asbestos, leather or the like. The ceramic tips for the fingers may be of any suitable material and may be cemented into position.

What is claimed is:

1. A sealing arbor for welding a glass neck to a glass cathode ray tube or the like, said arbor comprising a tube, a first sleeve disposed around said tube and movable along said tube, a second sleeve disposed around said first sleeve and rotatable with respect to said first sleeve, means for restraining said second sleeve from axial movement with respect to said first sleeve, said two sleeves having air passages for feeding air from the outside of said second sleeve in one direction along a portion of said first sleeve, a third flexible sleeve disposed around said first sleeve and adapted to acommodate and center a length of glass neck, said air passages serving to discharge air in the region within a centered glass neck, a head assembly rigidly attached to an end portion of said tube, said head assembly having a plurality of radially movable fingers, a stem disposed within said tube and extending beyond the ends of said tube, means controlled by said stem for moving said fingers radially outwardly for gripping the inside surface of a cathode ray tube for aligning said tube and neck, said first sleeve being frictionally retained in adjusted position on said tube after said neck and cathode ray tube have been aligned and disposed in predetermined relationship, said second sleeve being freely rotatable to permit an operator to blow air into the interior of the neck portion while the remainder of the arbor rotates with the glass parts when melting the adjoining edges of the neck and cathode ray tube together.

2. The construction according to claim 1 wherein said means for moving said fingers radially include at least one tapered operating member and means for moving said operating member longitudinally of said stem.

3. The construction according to claim 1 wherein said head assembly has two groups of movable fingers, one group being displaced from the other group longitudinally with respect to the stem, the means controlled by said stem for moving said fingers comprising a pair of tapered operating members and means controlled by said stem for controlling the separation between said operating members, each operating member having its tapered portion cooperating with the fingers in that group.

4. A sealing arbor for welding a glass neck to a glass cathode ray tube or the like, said arbor comprising a tube, a first sleeve disposed around said tube and movable along said tube to remain in any desired position by friction, a second sleeve disposed around said first sleeve and rotatable with respect to said first sleeve, means for restraining said second sleeve from axial movement with respect to said first sleeve, said two sleeves having air passages for feeding air from the outside of said second sleeve in one direction along a portion of said first sleeve, a third flexible sleeve disposed around said first sleeve and adapted to accommodate and center a length of glass neck, said air passages serving to discharge air in the region within a centered glass neck, a head assembly rigidly attached to an end portion of said tube, said head assembly having a plurality of radially movable fingers, a stem disposed within said tube and extending beyond the ends of said tube, means controlled by said stem for moving said fingers radially outwardly for gripping the inside surface of a cathode ray tube for aligning said tube and neck, said stem having an end for resting upon a support, said stem being rotatable on said support, said first sleeve remaining in position on said tube after said neck and cathode ray tube have been aligned and disposed in predetermined relationship, said second sleeve being freely rotatable to permit an operator to blow air into the interior of the neck portion while the remainder of the arbor rotates with the glass parts when melting the adjoining edges of the neck and cathode ray tube together.

5. The construction according to claim 4 wherein said head assembly has two groups of movable fingers, one group being displaced from the other group longitudinally with respect to the stem, the means controlled by said stem for moving said fingers comprising a pair of tapered operating members and means controlled by said stem for controlling the separation between said operating members, each operating member having its tapered portion cooperating with the fingers in that group.

6. A sealing arbor for welding a glass neck to a glass cathode ray tube or the like, said arbor comprising an elongated metal tube normally disposed in vertical position, a first sleeve disposed around said tube, said first sleeve being movable along said tube and having sufficient friction to remain in adjusted position during a welding operation, a second metal sleeve disposed around said first sleeve and freely rotatable with respect to said first sleeve, means for restraining said second sleeve against axial movement with respect to said first sleeve, said two sleeves having internal air passages for feeding air from the outside of said second sleeve and upwardly along a portion of said first sleeve, a third flexible sleeve disposed around said first sleeve and attached thereto and adapted to accommodate and center a length of glass neck extending upwardly from said third sleeve, said centered glass neck being adapted to extend beyond the top of said third sleeve and around the top end portion of said first sleeve to leave an annular air space within said glass neck and around said first sleeve, said air passages serving to discharge air in said annular region, a head assembly rigidly attached to the top portion of said tube, said head assembly including a sleeve-like member having a plurality of passages extending radially through the wall of said sleeve-like member, fingers disposed in said passages and freely movable radially of said sleeve-like member, a stem disposed within said tube and extending beyond the top and bottom ends of said tube, cam means carried by said stem for cooperation with the inside ends of said fingers for urging said fingers outwardly, means for operating said cam means upon rotation of said stem in one direction for forcing said fingers outwardly, said head assembly being adapted to be disposed within an abbreviated neck of a cathode ray tube and when said fingers are forced outwardly for gripping and centering said cathode ray tube neck portion, said entire arbor and cathode ray tube and glass neck portion being adapted to be rotated around the axis of said sleeves during welding, said second sleeve being adapted to remain stationary so that an operator can blow air into the air passages during welding, said first and third sleeves normally remaining in adjusted position after the glass parts have been aligned and disposed in predetermined relationship, said first and third sleeves being adjustable during the welding to maintain the opposing glass edges of the two neck portions in desired relationship.

7. The construction according to claim 6 wherein said stem has a threaded portion within the head assembly, said threaded portion cooperating with cam means for controlling the position of said fingers, said arbor normally having a support for the bottom of said stem and turning in such a direction that friction of the support on the stem bottom tends to maintain the fingers tightly against the inside of the cathode ray tube neck portion.

8. The arbor according to claim 6 wherein said head assembly has two groups of fingers, one group being longitudinally spaced from the other group, each group of fingers being adapted to engage the inside surface of the cathode ray glass neck portion and the two groups together serving to center and align said cathode ray tube neck portion with the length of glass neck to be attached thereto, a pair of cone shaped cam members for operating said fingers and means for effecting relative longitudinal movement between said two conical members, said members serving to move said fingers outwardly in one direction of rotation of said stem and serving to permit said fingers to move inwardly in reverse direction of movement of said stem.

9. The sealing arbor according to claim 6 wherein said head assembly has two longitudinally spaced groups of fingers, a nut-like conical member cooperating with a threaded portion of the stem within said head assembly for operating one group of fingers and a second conical member disposed on the end portion of said stem, said stem being freely rotatable with respect to said second member without rotation of said second member, means for restraining said two conical members against rotational movement whereby turning of said stem in one direction causes said conical members to separate from each other and turning of said stem in the reverse direction brings said two conical members closer together, said two conical members cooperating with their respective fingers for positioning said fingers radially of said head assembly.

10. The arbor according to claim 6 wherein said movable fingers have ceramic tips for engaging the glass.

References Cited in the file of this patent

UNITED STATES PATENTS

| | | |
|---|---|---|
| 2,731,771 | Harder | Jan. 24, 1956 |
| 2,813,374 | Bouwman et al. | Nov. 19, 1957 |
| 2,823,634 | Barth | Feb. 18, 1958 |

FOREIGN PATENTS

| | | |
|---|---|---|
| 614,261 | Great Britain | Dec. 13, 1948 |